Nov. 4, 1947.                G. F. ZUCKER                2,430,319
                          VEHICLE STOP DEVICE
                   Filed April 18, 1945          3 Sheets-Sheet 2
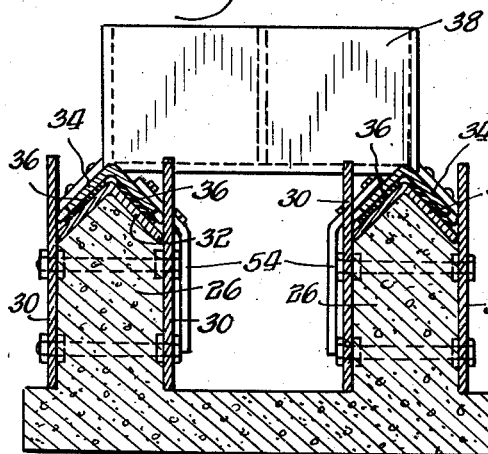
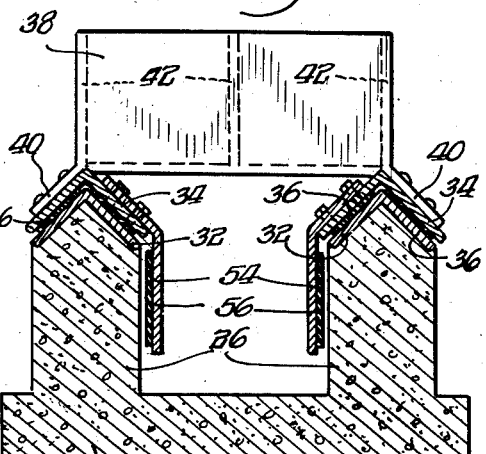
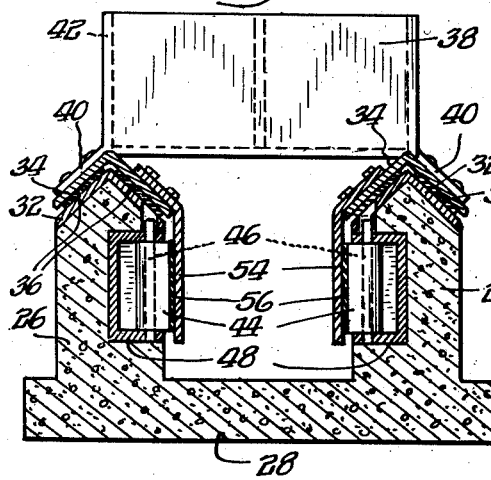
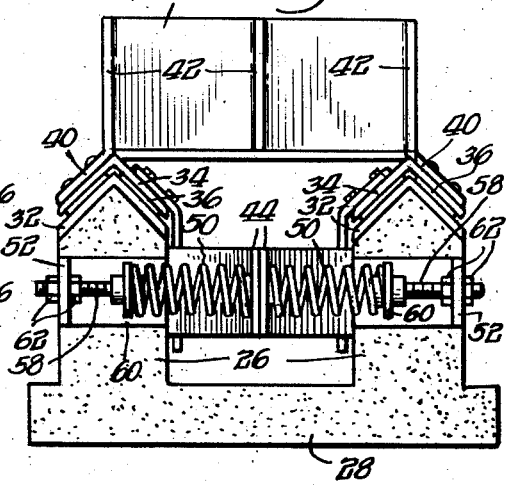
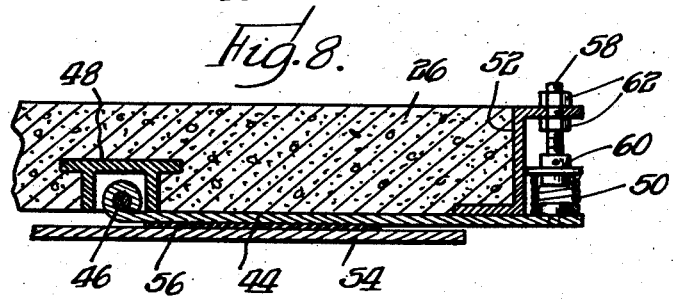
INVENTOR.
Gottlieb F. Zucker
BY
Loftus, Moore, Olsen & Trexler
Attys.

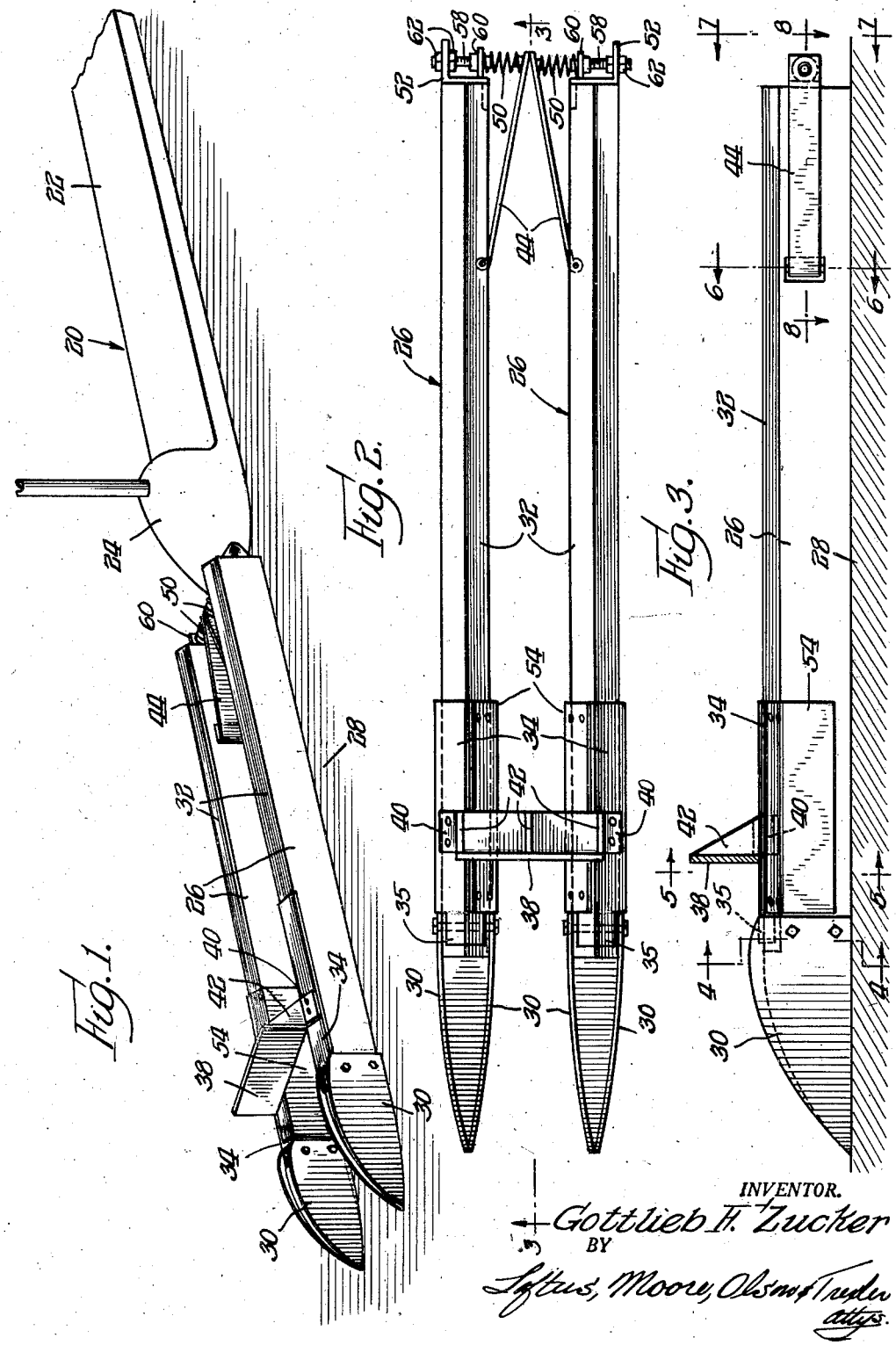

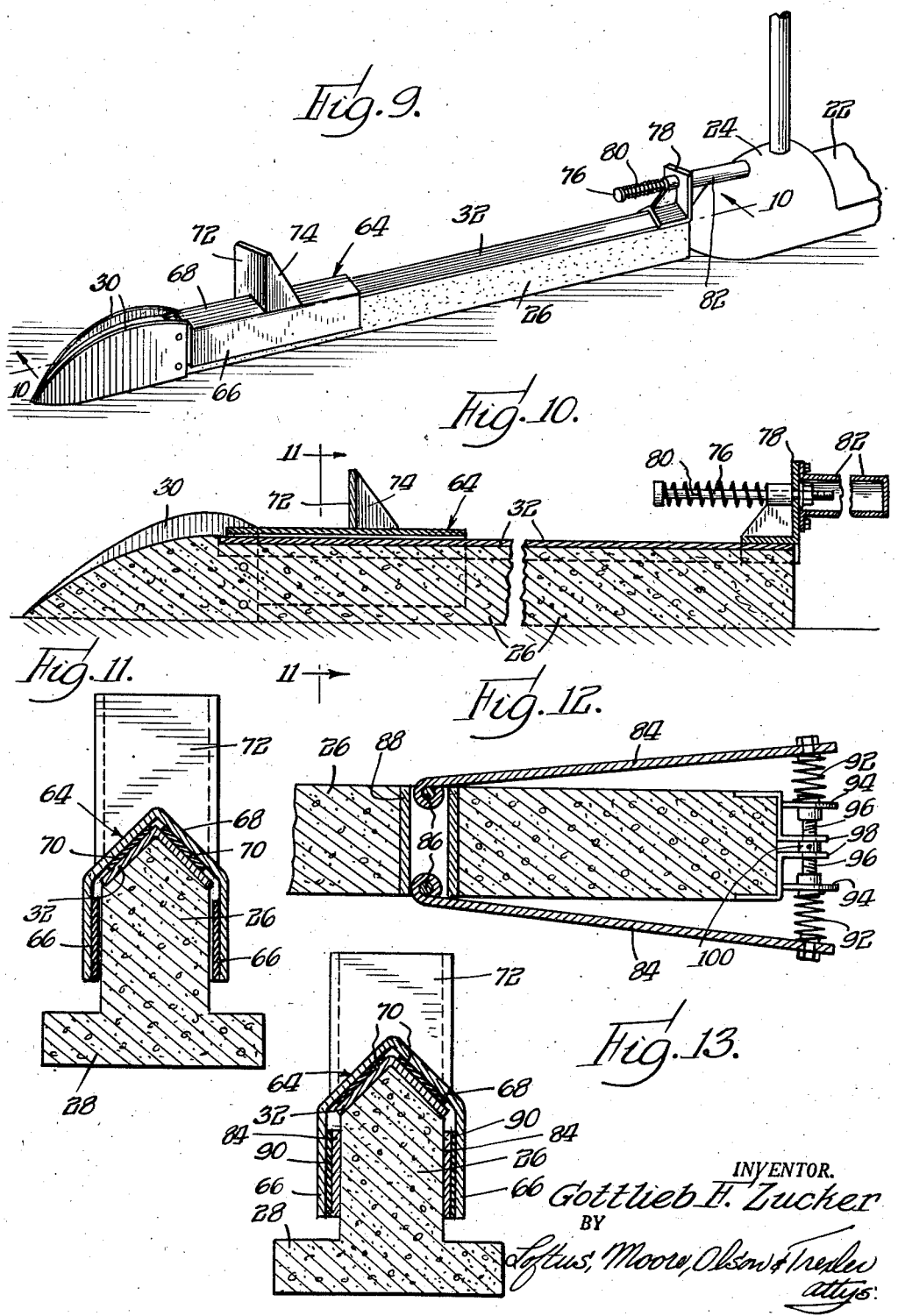

Patented Nov. 4, 1947

2,430,319

UNITED STATES PATENT OFFICE 2,430,319

VEHICLE STOP DEVICE

Gottlieb F. Zucker, Chicago, Ill.

Application April 18, 1945, Serial No. 589,059

15 Claims. (Cl. 188—32)

This invention relates to vehicle stop or bumper devices such for example as may be used with safety islands, bridge support posts, or other obstructions or protected zones commonly placed in vehicle traffic lanes; and it has for its object the provision of an improved arrangement of means for applying a controlled and gradual braking effect on a vehicle or car approaching the protected zone or obstruction in such position and in such manner as to be likely to run into or over said zone or obstruction.

In the preferred form and arrangement disclosed for accomplishing my objects, I have provided one or more rails extending along the driveway directly toward the end of the protected zone or obstruction, together with a brake device in connection with the rail in position to be engaged by a vehicle or car for applying a controlled and gradual braking effect on the car. The desired result has been accomplished by the use of a brake device in the form of a frame mounted in position on the rail and provided with friction brake lining means so as to have a proper and controlled retarding effect on the movement of the brake device along the rail, the arrangement preferably being such that the front end of the car is adapted to press downwardly on the frame with the car bumper in engagement with a rigid portion thereof for transmitting the braking effect from the brake device to the car. The improved device comprises further spring-mounted means at the end portion of the rail adjacent to the protected zone or obstruction adapted to apply a supplemental braking effect on the braking device and the car for definitely stopping the car after it has been slowed down substantially and before it has reached the protected zone.

It is another object of the invention to improve arrangements of this type in various features hereinafter pointed out. The preferred means by which the several objects have been attained are illustrated in the accompanying drawings in which Fig. 1 is a perspective view of an embodiment of the braking mechanism in position at one end of a protected zone and obstruction, specifically a safety zone or safety island of the type commonly provided for pedestrians.

Fig. 2 is a top plan view of the improved braking mechanism of Fig. 1, being shown on an enlarged scale.

Fig. 3 is a longitudinal sectional view of the braking mechanism of Fig. 2, on the line 3—3 thereof.

Figs. 4, 5 and 6 are vertical sectional views taken on the line 4—4, the line 5—5, and the line 6—6, respectively, of Fig. 3.

Fig. 7 is an end view of the mechanism of Fig. 3 as seen from the right therein.

Fig. 8 is a horizontal sectional view taken substantially at the line 8—8 of Fig. 3 through one of the rail structures.

Fig. 9 is a view similar to Fig. 1 but showing a modified form of brake device.

Fig. 10 is a longitudinal sectional view taken substantially at the line 10—10 of Fig. 9, but on an enlarged scale and with a portion broken away.

Fig. 11 is a vertical sectional view taken on an enlarged scale substantially at the line 11—11 of Fig. 10.

Fig. 12 is a horizontal sectional view through the end portion of a modified form of brake device; and Fig. 13 is a vertical sectional view through the rail of Fig. 12 and through the brake device used in connection therewith.

Referring now to Figs. 1 to 8 inclusive of the drawings, in which corresponding parts are indicated by the same reference characters, 20 indicates a structure comprising a safety zone of any approved type, the safety zone as shown comprising a platform 22 and an upstanding abutment 24 at the end of the platform.

At the end of the safety zone two oppositely disposed rails 26 are provided in parallel spaced relation to each other, such rails being in raised position above the driveway and extending directly toward the safety zone in alignment therewith. As shown in Fig. 4, the rails 26 are preferably formed of concrete and are integral with a concrete base 28 which is a part of or is inset into a driveway. At their outer ends, the rails 26 are provided with side plates 30 which are rigidly connected with the rail at opposite faces thereof, with their outer ends converging as is clearly shown in Fig. 2. As is shown in Figs. 1 and 4, the upper edges of the side plates 30 incline upwardly toward the rails so as to provide an inclined approach leading to the top faces of the rails. The space between the side plates is preferably filled with concrete formed integrally with the body of the rail, but with the top face of the concrete between the plates at a slightly lower level than that of the upper edges of the plates, as is clearly shown in Fig. 3.

As is shown in Fig. 4, the rails have longitudinally extending ridges at their top faces, such ridges being capped by angle bars 32 extending longitudinally of the rails. The angle bars 32 are arranged so as to be in parallel relation to each other, being secured rigidly in position on the rails so as strongly to resist longitudinal movement.

Upon the rails 26, there is mounted a brake member comprising two angle bars 34 positioned in nesting relationship to the angle bars 32 of the rails. As is clearly shown in Fig. 4, the angle bars 34 are provided on their inner faces with pieces of friction material 36 of any approved type. I have found pieces of brake lining satisfactory for use, serving to apply a heavy braking effect upon the movement of the angle bars 34 with respect to the angle bars 32. The arrangement of the rails and the angle bars 34 is such that a car riding up the edges of the side plates 30 into position upon the angle bars 34 applies pressure downwardly upon the angle bars and the friction material so as to produce a heavy retarding effect upon the movement of the bars 34 with respect to the bars 32. So as to insure that the car will be dropped onto the bars 34, they are provided with projections 35 extending forwardly between the plates 30.

The angle bars 34 are connected together, in the arrangement shown, by means of a vertically positioned plate 38 which is rigidly connected with both of the angle bars 34. In the arrangement shown, the plate 38 is in the form of an angle bar, the ends of which are connected with the angle bars 34 by means of lugs 40, as is clearly shown in Fig. 5. The upright plate portion 38 is preferably reinforced with respect to the horizontally positioned flange of the angle bar by means of triangular brace plates 42 as is best shown in Figs. 2 and 3. The arrangement is such that the plate 38 is very strongly held in position with respect to the angle bars 34.

The transverse plate 38 is designed to rise to such height as to be in position to engage the bumper of a car moving along above either one or both of the rails 26. When a car approaches the rails 26 in such position as to move along above one of the rails, the axle or other cross-positioned portion of the car rides up the side plates 30 and is brought into position upon the outer ends of the angle bars 34, with the bumper of the car in engagement with the cross-positioned plate 38. With the car applying downward pressure upon the angle bars 34, a very heavy braking effect is applied on the car from the brake devices slidably mounted upon the rails. The arrangement is such that this braking effect is applied continuously during the entire movement of the car along the rails toward the safety zone. The braking effect is strong enough to retard very substantially the movement of the car toward the safety zone, or perhaps to stop the car completely, unless the car is moving at a very high rate of speed.

In the preferred embodiment of the invention, means is provided for applying a heavy supplemental braking effect upon the car at about the limit of the movement of the car toward the safety zone. Such supplemental braking means comprises arms 44 pivotally mounted on the inner faces of the rails 26 at their inner end portions adjacent to the safety zone 20. The arms 44 are mounted in position by means of pins 46 mounted in socket pieces 48 set in the inner faces of the rails 26 as is best shown in Fig. 8, the arrangement being such that the arms 44 are movable toward and from the faces of the rails 26. In Fig. 2, the arms 44 are shown at the limit of their movement away from the faces of the rails, being held in such position by coiled springs 50 interposed between the ends of the arms and brackets 52 secured rigidly in position at the ends of the rails. The construction is such that the springs 50 resist very strongly the movement of the arms toward the faces of the rails.

For cooperation with the arms 44 for providing the desired supplemental braking effect, I have provided plates 54 depending from the brake members 34 opposite the inner faces of the rails 26 (See Fig. 5). The plates 54 are provided on their inner faces with friction means such as pieces 56 of brake lining strongly secured in position upon the plates in slightly spaced relation to the rails 26. When a car engages the cross plate 38 so as to move the brake device toward the safety zone, the friction means 56 carried by the plates 54 is brought into engagement with the outer faces of the spring positioned arms 44 at about the end of the movement of the car toward the safety zone. The pressure of the plates 54 and the friction means thereon against the arms 44 causes the arms to swing inwardly toward the rails against the action of the springs 50 so as to produce a very heavy retarding effect upon the further movement of the brake device along the rail.

The arrangement is designed to be such that the supplemental braking means comprising the arms 44 shall definitely stop a car before the car reaches the safety zone. As will be readily understood, the frictional engagement between the plates 54 and the arms 44 is very strong in any case where the speed of the car is sufficient to carry the car into position for bringing the supplemental braking means into operation. In many such cases, the frictional grip of the plates 54 on the arms 44 is strong enough to leave the car virtually locked in position upon the rails. For making it possible to release a car under such circumstances without the breakage of any of the parts, adjustable means is provided for the outer ends of the springs 50. As is best shown in Fig. 7, such adjustable means comprises screws 58 extending through the Z-bars 52 and provided at their ends with bearing plates 60 adapted to engage the ends of the springs 50. When it is desired to loosen the tension of the springs 50 for enabling a car to be driven out of engagement with the rails, such result can be effected by loosening one or more of the nuts 62 by which the screws 58 are secured to the Z-bars, whereby to release the screws from holding position.

In Figs. 9, 10 and 11, a modified form of brake means is shown. In this arrangement, a single rail 26 is provided at the end of the safety zone, such single rail 26 being of the same type as that above described in connection with the showing of Figs. 1 to 8, being provided at its top face with an angle bar 32 extending along the rail with the angle portion disposed upwardly so as to provide a ridge at the top face of the rail. Upon this single rail 26, I have mounted a brake device in the form of a channel 64, with the side flanges 66 extending downwardly in slightly spaced relation to the side faces of the rail, and with the web portion of the channel in the form of an angle bar 68 which is adapted to nest with the angle bar 32. As is clearly shown in Fig. 11 the angle bar portion 68 of the brake device is provided with friction means 70 adapted by engagement with the angle bar portion 32 of the rail to apply a heavy braking effect upon the movement of the channel along the rail. As is best shown in Fig. 9, the brake device comprising the channel bar 68 is provided with an upstanding plate 72 rigidly mounted thereon in position to engage the bumper of a car moving along above the rail. In the preferred arrangement shown, the plate 72 is braced in position by means of triangular brace pieces 74. The construction is such that a car riding up the side plates 39 is brought into position to press downwardly upon the angle bar 68 for increasing the frictional effect of the lining parts 70 in their engagement with the rail. The flanges 66 of the channel member are adapted by engagement with the side faces of the rail to hold the brake device in position on the rail for sliding movement therealong. Inasmuch as the device operates in substantially the same way as that described above, it is unnecessary to describe the operation further herein.

In the arrangement shown in Figs. 9, 10 and 11, the means for applying a heavy supplemental braking effect upon the movement of the brake device at about the end of the movement of the car toward the safety zone is of a modified form. In the arrangement shown in Figs. 9 and 10, the supplemental braking means comprises a plunger 76 slidably mounted in a heavy bracket 78 rising from the end of the rail. A coiled spring 80 mounted upon the plunger 76 serves normally to hold the plunger in extended position with respect to the bracket 78 in position to be engaged by the bearing plate 72 at about the end of the movement of the brake device toward the safety zone. The spring 80 and the cooperating parts are designed to be of such size and strength as to be able to stop the movement of a car after the car has been very substantially slowed down by the initial braking effect produced by the movement of the brake device comprising the channel member 68 along the rail. The bracket 78 is preferably provided with a shield in the form of a cylinder 82 into which the end of the plunger 76 may extend when forced toward the right in Fig. 10 against the action of the spring 80.

In Figs. 12 and 13, still another modified form of structure is shown, comprising two arms 84 pivotally mounted at opposite faces of the rail 26, being mounted in position by means of pins 86 within a box 88 opening through the rail, as shown in Fig. 12. The brake device illustrated in Fig. 13 is similar to that shown in Fig. 11 except that in the arrangement of Fig. 13 the side flange portions 66 of the channel 64 are provided with friction means 90 in the form of pieces of brake lining in position to engage the arms 84 when standing in extended position as shown in Fig. 12. Heavy springs 92 are provided for pressing the arms 84 outwardly, such springs bearing at their outer ends against the arms and bearing at their inner ends against square nuts 94 mounted on a bolt 96 supported rotatably in position by brackets 98, such nuts 94 being held from rotation by engagement with the brackets. The bolt 96 is provided at opposite ends with reversely arranged screw threads whereby upon rotation of the bolt by means of an intermediate head 100 the nuts 94 will be moved toward or away from each other depending upon the direction of rotation of the bolt. As will be readily understood, when the bolt 96 is rotated in the direction for moving the nuts 94 outwardly away from each other, the springs 92 are caused to press outwardly upon the arms 84.

When the brake device 64 is moved along the rail 26 toward the right in Fig. 12 so as to bring the friction means 90 into engagement with the outer faces of the arms 84, a heavy braking effect is applied on the movement of the brake device supplemental to the braking effect produced by the friction means 70. The arrangement is designed to be such that when a car has been slowed down by the movement of the brake device along the rail the supplemental braking effect produced by the engagement of the friction means 90 with the arms 84 shall be sufficient for bringing the car to a stop. In the event that a car should be held firmly in position on the rail at the end of a movement of the car therealong, the springs 92 can be loosened by an appropriate rotation of the bolt 96 by means of the head 100.

By the use of my improved arrangement, I have provided a highly efficient braking means which is effective for stopping a vehicle or car before it reaches the safety zone of a safety island, or other zone or abutment to be guarded and protected. By the use of this improved arrangement, the likelihood of injury to pedestrians as well as damage and injury to vehicles and other occupants is very substantially reduced and precluded.

While I prefer to employ the form and arrangement of parts as shown in the drawings and as above described, the invention is not to be limited thereto, except so far as the claims may be so limited, it being understood that changes might well be made in the form and arrangement of parts without departing from the invention.

What is claimed is:

1. In an arrangement of the type described, the combination of a rail extending in raised position with respect to a driveway toward a protected zone and having an inclined outer end portion, and a brake device movably mounted on said rail and having effective braking relationship to the rail and comprising bearing means thereon adapted by engagement with a vehicle moving along above the rail to apply a braking effect on the vehicle, said inclined end portion being arranged to deposit a vehicle axle or body portion engaged thereby onto said brake device.

2. In an arrangement of the type described, the combination of a rail extending in raised position with respect to a driveway toward a protected zone and having an inclined outer end portion, and a brake device slidably mounted on said rail and having effective frictional engagement with the rail for applying a braking effect on the device and comprising bearing means thereon adapted by engagement with a vehicle moving along above the rail to apply a braking effect on the vehicle, said inclined end portion being arranged to deposit a vehicle axle or body portion engaged thereby onto said brake device.

3. In an arrangement of the type described, the combination of an angle bar mounted rigidly in raised position with respect to a driveway and extending toward a safety zone, inclined approach means leading up to said angle bar at its outer end portion, a second angle bar slidably mounted on said first named angle bar, friction means interposed between said angle bars for applying a braking effect on the movement of said second angle bar along said first named angle bar, and bearing means carried by said second angle bar adapted by engagement with a car moving along above said first named angle bar to apply a braking effect on the car, said inclined approach means being arranged to deposit a vehicle axle or body portion engaged thereby onto said second angle bar.

4. In an arrangement of the type described, the combination of two oppositely disposed rails in parallel spaced relationship to each other and in raised position with respect to a driveway and extending toward a safety zone, each of said rails having an inclined outer end portion leading to its top face, brake members movably mounted on said rails and having effective braking relationship to the rails, and a transversely positioned member connecting said brake members and adapted by engagement with a car moving along above at least one of said rails to apply a braking effect on the car, said inclined end portions being arranged respectively to deposit a vehicle axle or body portion engaged thereby onto said brake members.

5. In an arrangement of the type described, the combination of two oppositely disposed rails in parallel spaced relation to each other and in raised position with respect to a driveway and extending toward a safety zone, inclined approach devices leading to the top faces of the rails at their outer ends, brake members slidably mounted on said rails respectively and having effective frictional engagement with the rails, said inclined approach devices being arranged respectively to deposit a vehicle axle or body portion engaged thereby onto the brake members, and a transversely positioned plate rigidly connected with said brake members and adapted by engagement with a car moving along above at least one of said rails to apply a braking effect on the car.

6. In an arrangement of the type described, the combination of two oppositely disposed rails rising above a driveway and extending toward a safety zone with longitudinal ridges at their top faces in parallel spaced relationship to each other, inclined approach devices leading to the top faces of the rails at their outer ends, angle bars slidably mounted on said ridges, said inclined approach devices being arranged respectively to deposit a vehicle axle or body portion engaged thereby onto the angle bars, frictional means interposed between said angle bars and said rails for applying a braking effect on the movement of said angle bars along the rails, and a transversely positioned plate connected with said angle bars and adapted by engagement with a car moving along above at least one of said rails to apply a braking effect on the car.

7. In an arrangement of the type described, the combination of a rail formed of concrete and rising above a driveway with an inclined approach at its outer end and having a ridge along its top face capped by an angle bar extending longitudinally of the rail toward a safety zone, a second angle bar slidably mounted on said first named angle bar in frictional engagement therewith, and bearing means carried by said second angle bar in position for engagement with a car moving along above the rail for applying a braking effect on the car.

8. In an arrangement of the type described, the combination of two oppositely disposed rails formed of concrete and rising above a driveway with inclined concrete approach portions at their outer ends and capped by angle bars fixed in position longitudinally of the rails and extending in parallel spaced relationship to each other toward a safety zone, other angle bars slidably mounted on said first named angle bars in nested relationship thereto, friction means interposed between the angle bars for applying a braking effect on the movement of said other angle bars along the rails, and a transversely positioned plate connected rigidly with said other angle bars and adapted by engagement with a car moving along above at least one of said rails to apply a braking effect on the car.

9. In an arrangement of the type described, the combination of a rail extending in raised position with respect to a driveway toward a safety zone and having an inclined outer end portion rising to the level of the top face of the rail, a channel member in inverted position on said rail, friction means secured to said channel member in position to engage said rail for retarding the movement of the channel member along the rail, and bearing means on said channel member adapted by engagement with a car moving along above the rail to apply a braking effect on the car.

10. In an arrangement of the type described, the combination of a rail formed of concrete and rising above a driveway with an inclined approach at its outer end and having a ridge along its top face capped by an angle bar extending along the rail toward a safety zone, a channel member in inverted position on said rail with its intermediate web portion in the form of an angle bar nested with said first named angle bar and with its flange portions extending downwardly at the sides of the rail, friction means secured to said channel member in position to engage said rail for retarding the movement of the channel member along the rail, and bearing means on said channel member adapted by engagement with a car moving along above the rail to apply a braking effect on the car.

11. In an arrangement of the type described, the combination of a rail extending in raised position with respect to a driveway toward a safety zone and having an inclined outer end portion, and a brake device movably mounted on said rail and having effective braking relationship to the rail and comprising bearing means thereon adapted by engagement with a car moving along above the rail to apply a braking effect on the car, said inclined end portion being arranged to deposit a vehicle axle or body portion engaged thereby onto said brake device, said brake device on said rail being at such a height as to be given effective downward pressure by engagement with the car at the end of its movement upwardly along said inclined end portion of the rail into position on said brake device.

12. In an arrangement of the type described, the combination of a rail extending in raised position with respect to a driveway toward a safety zone and having an inclined outer end portion rising to the level of the top face of the rail, a brake device movably mounted on said rail and having effective braking relationship thereto throughout substantially its entire movement along the rail and comprising bearing means thereon adapted by engagement with a car moving along above the rail to apply a braking effect on the car, said inclined end portion being arranged to deposit a vehicle axle or body portion engaged thereby onto said brake device, and other means adapted yieldingly to oppose the movement of said brake device at about the end of its movement toward said safety zone.

13. In an arrangement of the type described, the combination of a rail extending in raised position with respect to a driveway toward a safety zone and having an inclined outer end portion rising to the level of the top face of the rail, a brake device movably mounted on said rail and having effective braking relationship thereto throughout substantially its entire movement along the rail and comprising bearing means thereon adapted by engagement with a car moving along above the rail to apply a braking effect on the car, said inclined end portion being arranged to deposit a vehicle axle or body portion engaged thereby onto said brake device, an arm movably mounted on said rail, yielding means normally holding said arm in divergent position with respect to the rail, and means on said brake device adapted to engage said arm at about the limit of the movement of the brake device along the rail and adapted by such engagement to apply a heavy supplemental braking effect on said brake device.

14. In an arrangement of the type described, the combination of a rail extending in raised position with respect to a driveway toward a safety zone and having an inclined outer end portion rising to the level of the top face of the rail, a brake device movably mounted on said rail and having effective braking relationship thereto throughout substantially its entire movement along the rail and comprising bearing means thereon adapted by engagement with a car moving along above the rail to apply a braking effect on the car, said inclined end portion being arranged to deposit a vehicle axle or body portion engaged thereby onto said brake device, an arm pivotally mounted on said rail so as to swing transversely with respect thereto, spring means normally holding said arm displaced transversely to the limit of its motion from the face of the rail, and a plate mounted rigidly on said brake device adapted to engage said arm at about the limit of the movement of the brake device along the rail and adapted by such engagement to apply a heavy supplemental braking effect on said brake device.

15. In an arrangement of the type described, the combination of a rail extending in raised position with respect to a driveway toward a safety zone and having an inclined outer end portion rising to the level of the top face of the rail, a brake device movably mounted on said rail and having effective braking relationship thereto throughout substantially its entire movement along the rail and comprising bearing means thereon adapted by engagement with a car moving along above the rail to apply a braking effect on the car, said inclined end portion being arranged to deposit a vehicle axle or body portion engaged thereby onto said brake device, and means comprising a spring in position to be engaged between the rail structure and the brake device at about the limit of the movement of the brake device along the rail toward the safety zone for applying a heavy supplemental braking effect on the movement of the brake device.

GOTTLIEB F. ZUCKER.

REFERENCES CITED

The following references are of record in the file of this patent:

UNITED STATES PATENTS

| Number | Name | Date |
|---|---|---|
| 293,846 | Bonzano | Feb. 19, 1884 |
| 1,334,896 | English | Mar. 23, 1920 |
| 1,472,132 | Osborn | Oct. 30, 1923 |
| 2,000,974 | Mead | May 14, 1935 |
| 1,551,556 | Gust | Sept. 1, 1925 |